United States Patent [19]

Aoki et al.

[11] Patent Number: 4,805,723

[45] Date of Patent: Feb. 21, 1989

[54] LOCK ASSEMBLY FOR ONBOARD OPENING COVER

[75] Inventors: Kohji Aoki, Nagoya; Yasuda Tomio, Kasukabe, both of Japan

[73] Assignee: Aisin Seiki Kabushiki Kaisha, Kariya, Japan

[21] Appl. No.: 131,424

[22] Filed: Dec. 10, 1987

[30] Foreign Application Priority Data

Dec. 12, 1986 [JP] Japan ................................ 61-295989

[51] Int. Cl.4 ............................................ B60K 28/12

[52] U.S. Cl. .................................... 180/289; 180/268; 200/85 A; 70/264; 307/10 R

[58] Field of Search ............... 180/273, 271, 272, 287, 180/289, 268, 270; 70/264; 307/10 R, 10 AT, 10 JB; 200/85 A

[56] References Cited

U.S. PATENT DOCUMENTS

| | | | |
|---|---|---|---|
| 3,871,474 | 3/1975 | Tomlinson et al. | 180/273 |
| 4,678,058 | 7/1987 | Wooters | 200/85 A |
| 4,709,776 | 1/1987 | Metz | 180/281 |
| 4,719,775 | 1/1988 | Pross | 70/264 |
| 4,722,550 | 2/1988 | Imaoka et al. | 180/268 |
| 4,730,120 | 3/1988 | Okada | 180/289 |

FOREIGN PATENT DOCUMENTS

| | | |
|---|---|---|
| 59-96369 | 6/1984 | Japan . |
| 60-88661 | 5/1985 | Japan . |
| 60-143164 | 7/1985 | Japan . |

*Primary Examiner*—Richard A. Bertsch
*Attorney, Agent, or Firm*—Banner, Birch, McKie & Beckett

[57] ABSTRACT

An arrangement for locking a cover which can be opened and closed to cover an opening of a vehicle such as a door or luggage lid is disclosed. Means for detecting the presence or absence of an occupant within the vehicle as well as means for detecting the open or closed condition of the cover are provided. When the absence of an occupant is detected and the closed condition of the opening cover is detected, a lock mechanism which blocks an opening movement of the opening cover is locked. In this manner, if an occupant has forgotten to lock a door or doors when getting off his vehicle, the doors are automatically locked, thus reliably preventing a theft or tampering with the vehicle.

8 Claims, 12 Drawing Sheets

Fig. 2b
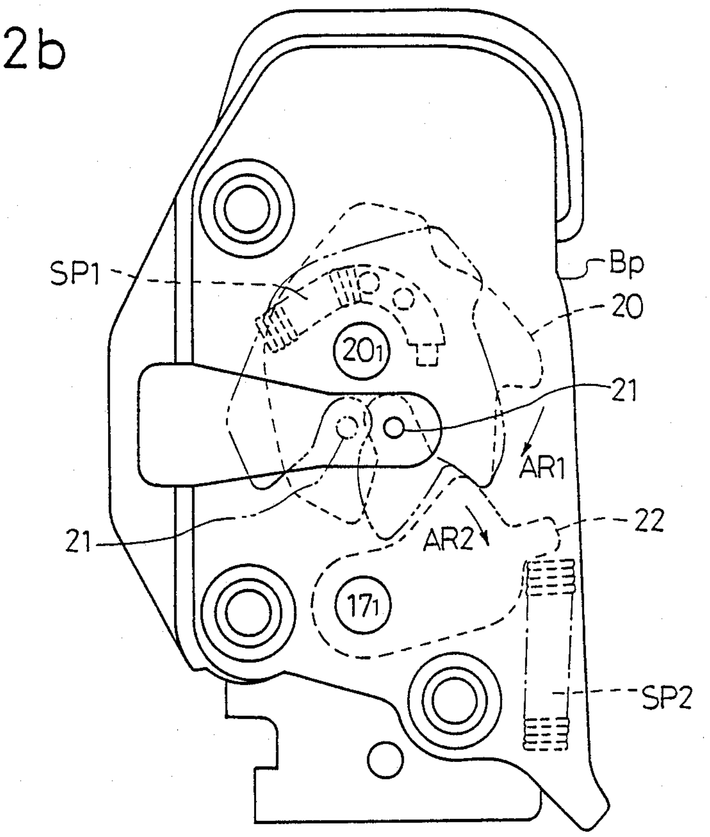
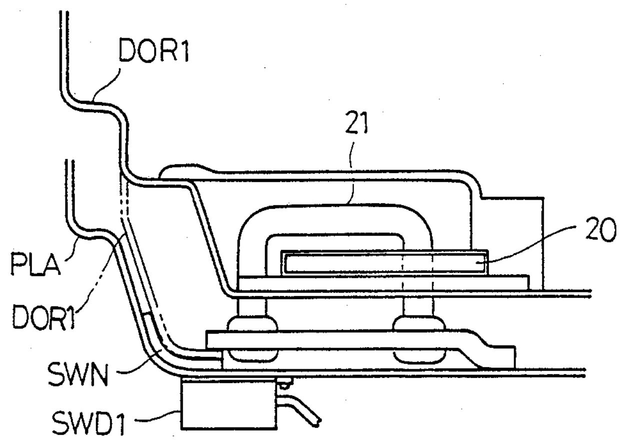
Fig. 2c

LOCK ASSEMBLY FOR ONBOARD OPENING COVER

BACKGROUND OF THE INVENTION

The invention relates to an apparatus which prevents a locking of a door of a vehicle from being forgotten.

A door of a vehicle is usually provided with a latch mechanism which latches a door against opening, and a door lock mechanism which prevents an unlatching of the latch mechanism. When the door lock mechanism is unlocked, an outside door handle or inside door handle may be operated to unlatch the latch mechanism to open the door. When the door lock mechanism is locked, the latch mechanism cannot be unlatched if the outside or the inside door handle is operated, thus preventing the door from being opened. (It is to be noted that some vehicle is provided with a latch mechanism which is unlatched by the operation of an inside door handle independently from the locked/unlocked condition of the door lock mechanism.)

A door lock mechanism of the kind described cannot be locked unless an occupant operates an inside door locking button or a door lock key. As a consequence, a driver of the vehicle may fail to lock the door because he has got out of the vehicle while carrying a luggage or because he has made haste in getting off the vehicle, causing the likelihood that the vehicle may be subject to a theft or either part of the vehicle or any articles left therein may be tampered with.

An accident of the kind described is frequently experienced by a residence delivery vehicle or a patrol car. In actuality, a patrol car may be stolen by an offender for his flight during an instance of emergency service.

It is an object of the invention to reliably achieve a locking of a door or the like when an occupant is off his vehicle, thus preventing a theft of a vehicle or a tampering with the vehicle or articles placed therein.

SUMMARY OF THE INVENTION

The above object is accomplished in accordance with the invention by providing a lock assembly for onboard opening cover comprising means for detecting the presence or absence of an occupant, and means for detecting an open or closed condition of an onboard opening cover which is disposed to open or close an onboard opening, and characterized in that a lock mechanism which blocks an opening movement of the onboard opening cover is locked when the absence of an occupant is detected and the closed condition of the onboard opening cover is detected.

With this arrangement, when an occupant gets out of his vehicle and closes an opening cover such as a door, the opening cover is automatically locked, thus, reliably preventing a theft of the vehicle or a tampering with the vehicle after the occupant has moved away from his vehicle.

Other objects and features of the invention will become apparent from the following description of an embodiment thereof with reference to the drawings.

BRIEF DESCRIPTION OF THE DRAWINGS

FIG. 2*b* is a side elevation showing a door latch mechanism of the assembly shown in FIG. 1 in detail;

FIG. 2*c* is a side elevation, partly in section, of the door latch mechanism of the assembly shown in FIG. 1;

DESCRIPTION OF EMBODIMENT

Figure 1:
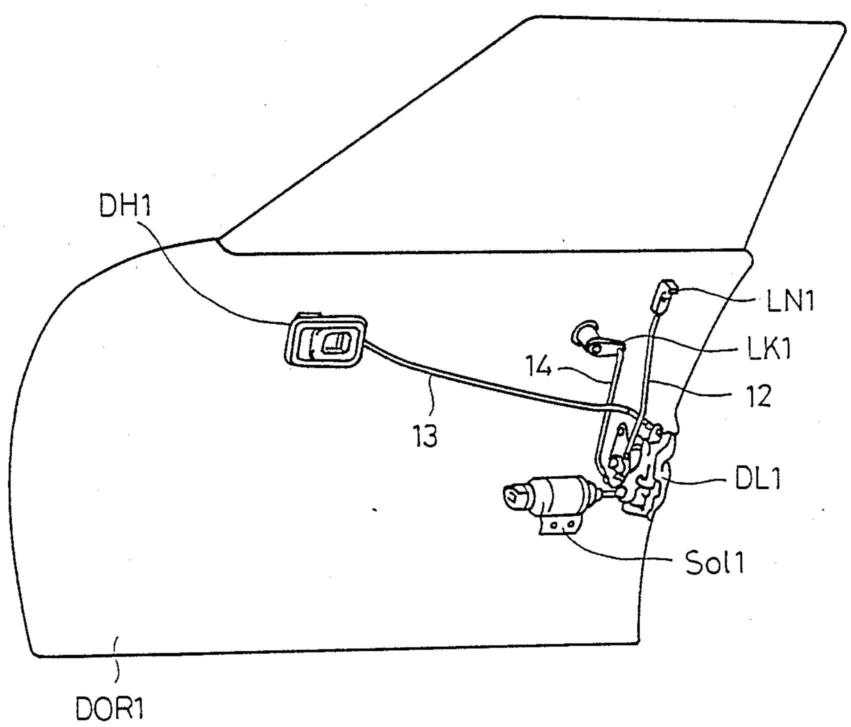
FIG. 1 is a perspective view of part of a door lock assembly for vehicle according to one embodiment of the invention, illustrating the appearance thereof.

FIG. 1 is a perspective view illustrating part of a mechanism which is used in a door lock assembly for an automobile having the capacity for four passengers which is constructed in accordance with one embodiment of the invention, specifically showing a door lock and latch mechanism DL1 mounted on a front right-hand (hereafter abbreviated as FR, the same denotation being used as a suffix) door DOR1 and a peripheral construction therefor.

Referring to FIG. 1, the door lock and latch mechanism DL1 is engaged by a door lock solenoid Sol1 supported by the FR door DOR1, an inside door locking button LN1 and an inside door handle DH1, a door key cylinder LK1 and an outside door handle (not shown) which is mounted on the outside of the door DOR1.

Figure 2A:
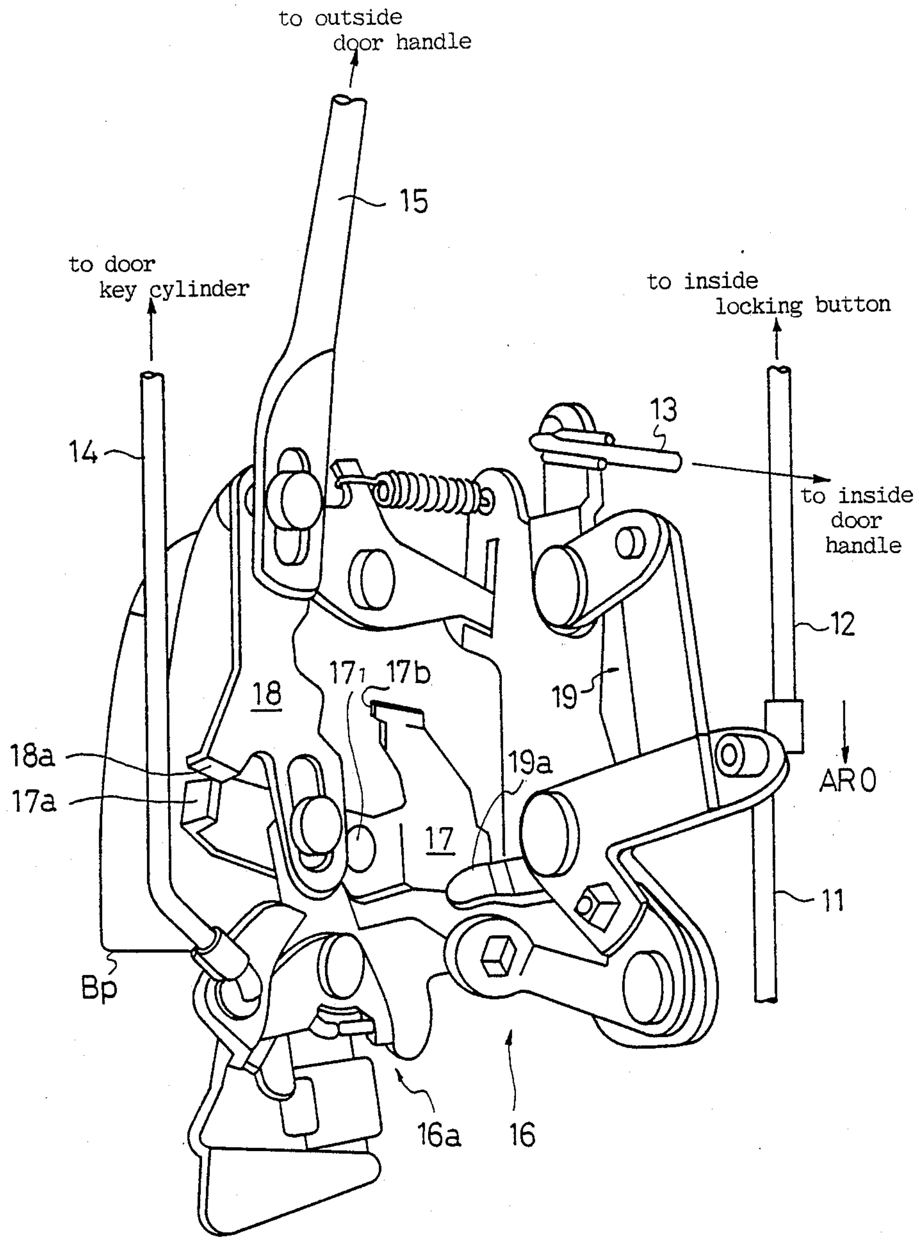
FIG. 2*a* is a perspective view of a door lock mechanism of the assembly shown in FIG. 1 in detail.

FIG. 2*a* shows the appearance of a door lock mechanism for the door lock and latch mechanism DL1 associated with the FR door DOR1. Specifically, the unlocked condition of the door is shown in FIG. 2*a.* Under this condition, an unlatch plate 17 and a pushing plate 18 engage each other at their respective folds 17*a,* 18*a.* Hence, when the pushing plate 18 is driven downward, as viewed in this Figure, the unlatch plate 17 is rotated counter-clockwise about a pivot $17_1$, which is pivotally mounted on a baseplate BP. The opposite ends of the pivot are secured to the unlatch plate 17 and a detent lever 22 of the door latch mechanism which will be described later in connection with FIG. 2*b,* whereby an angular movement of the unlatch plate is transmitted to the detent lever 22 to unlatch the door latch mechanism, thus allowing the door to open. The pushing plate 18 is driven by an outside door handle through a rod 15. Thus, under the unlocked condition, the outside door handle may be operated to unlatch the door latch mechanism.

In this connection, it will be understood that by releasing the engagement between the folds 17*a* and 18*a* of the unlatch plate 17 and the pushing plate 18, respectively, the unlatch plate 17 cannot be angularly driven if the outside handle is operated. This represents a locked condition.

The mechanism can be locked from its unlocked condition shown in FIG. 2*a* in three ways. First, the inside door locking button LN1 may be operated for purpose of locking. Specifically, it may be depressed downward as viewed in FIG. 1, whereby a rod 12 moves in a direction indicated by an arrow AR0, thus displacing the pushing plate 18 to the right, as viewed in this Figure, through a linkage 16 and a swivel mechanism 16*a*. Second, the door key cylinder LK1 may be operated for purpose of locking Specifically, when it is turned counter-clockwise, as viewed in FIG. 1, a rod 14 is driven upward, thus displacing the pushing plate 18 to the right, as viewed in FIG. 2, acting through the swivel mechanism 16*a*. Third, the door lock solenoid Sol1 may be energized. This pulls a rod 11 downward, as viewed in FIG. 2, whereby a lock condition is established in the same manner as when the inside door locking button LN1 is operated. The unlocked condition may be established by a reverse procedure to that mentioned above. However, it is to be noted that since the door lock solenoid Sol1 is acting in one direction, it cannot be utilized for purpose of unlocking. The door latch mechanism may be utilized to unlock the door, independently from the above means, as will be described later.

Figure 2D:
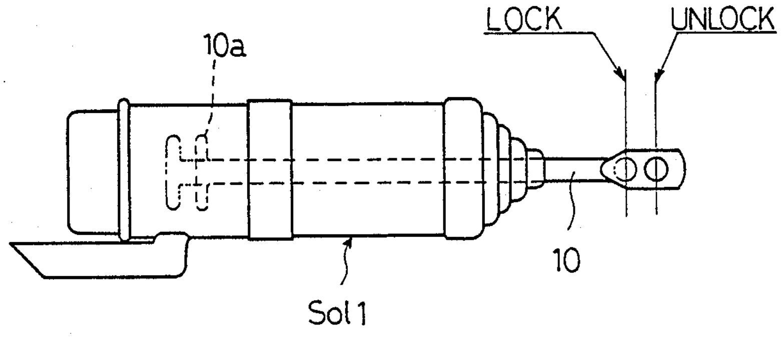
FIG. 2*d* is a side elevation of a door lock solenoid Sol1 of the assembly shown in FIG. 1.
Figure 2E:
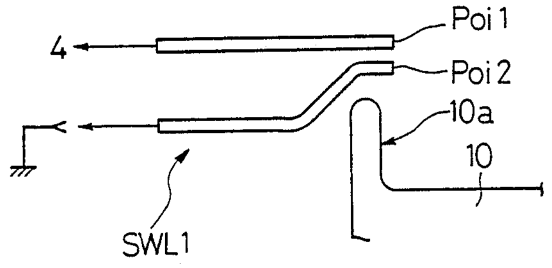
FIG. 2*e* is an enlarged side elevation of part of the door lock solenoid Sol1 shown in FIG. *2d;*

Referring to FIGS. 2*d* and 2*e*, the door lock solenoid Sol1 will now be described. The solenoid Sol1 includes a plunger 10, which is driven to a position LOCK shown in FIG. 2*d*, when the solenoid is energized. Since the plunger 10 is engaged by the rod 11, the latter is pulled downward, as viewed in FIG. 2*a*. The plunger 10 is internally formed with a flange 10*a*, which operates upon an internally housed door lock switch SWL1 shown in FIG. 2*e*, completing the connection between switch leads Poi1 and Poi2 of the switch SW1 in the position LOCK and opening the circuit between these switch leads in its position UNLOCK.

It will be noted that the inside locking button LN1, the door key cylinder LK1, the plunger 10 of the door lock solenoid Sol1 and the pushing plate 18 (as far as its lateral movement, as viewed in FIG. 2*a*, is concerned) are mechanically coupled together through the rods 11, 12, 14, the linkage 16 and the swivel mechanism 16*a*, whereby operation of one of these members changes the condition of others. By way of example, when the door key cylinder LK1 is operated for locking, the inside locking button LN1 is driven to its depressed position which it assumes when the button is operated, the plunger 10 is driven to its position LOCK while when the door key cylinder LK1 is operated for unlocking, the inside locking button LN1 is driven to its unlocked position and the plunger 10 is driven to its position UNLOCK. Hence, the door lock switch SWL1 which is internally housed within the door lock solenoid Sol1 operates to detect the locked/unlocked condition of the door lock mechanism.

On the other hand, the inside door handle DH1 is effective, when operated, to act upon the unlatch plate 17 for its angular movement through the rod 13, a linkage 19 and a swingable lever 19*a*, independently from the pushing plate 18. Accordingly, if the door lock mechanism is in its locked condition, the inside door handle DH1 may be operated or pulled toward the viewer, as viewed in FIG. 1, to unlatch the door latch mechanism. This provides for an emergency exit from the vehicle.

FIG. 2*b* schematically shows the door latch mechanism of the door lock and latch mechanism DL1. In FIG. 2*b*, the left-hand side of this Figure corresponds to the inboard side of the vehicle. The door latch mechanism comprises a forked bolt 20 mounted on the door DOR1, a detent lever 22, and a striker 21 which is mounted on a car body (which is actually a center pillar PLA shown in FIG. 2*c*). The forked bolt 20 is fixedly mounted on a pivot $20_1$ which is pivotally mounted on the baseplate BP, and is urged to rotate clockwise or in a direction indicated by an arrow AR1, by a coiled compression spring SP1. The detent lever 22 is fixedly mounted on the rotatable pivot $17_1$, mentioned above, and is urged to rotate counter-clockwise or in the opposite direction from the arrow AR2 by a coiled compression spring SP2.

Illustration in broken lines shown in FIG. 2*b* indicate a fully latched condition in which the forked bolt 20 has seized the striker 21 and has been rotated counter-clockwise sufficiently until its further rotation is constrained by the detent lever 22. Phantom lines in FIG. 2*b* show a primary latch condition or a so-called half-door condition in which the forked bolt 20 has seized the striker 21, but its angular movement is constrained by the detent lever 22 before it has been sufficiently rotated.

As mentioned previously, the pivot $17_1$ is pivotally mounted on the baseplate, and is secured to the unlatch plate 17 of the door lock mechanism on the end remote from the detent lever 22, and thus is rotatable together with the unlatch plate 17. When the detent lever 22 rotates in the direction of the arrow AR2, the forked bolt 20 is released from constraint against rotation, whereby it rotates in the direction of the arrow AR1 under the resilience of the spring SP1, thus disengaging it from the striker 21. Thus, the mechanism is unlatched to permit the door DOR1 to be opened.

When the door DOR1 is closed, the striker 21 is brought into abutment against the forked bolt 20, forcibly rotating the striker 21 and the detent lever 22 against the resilience of the springs SP1 and SP2, respectively. In this manner, the latch mechanism is latched by an opposite procedure from that mentioned above. Since the detent lever 22 rotates at this time, the unlatch plate is also driven for rotation through the pivot $17_1$. Accordingly, when the lock mechanism is in its locked condition, a pawl 17*b* formed on the end of the unlatch plate 17 drives the pushing plate 18 to the left, as viewed in FIG. 2*a*, thus establishing the unlatched condition. However, if the outside door handle is then operated, the pushing plate 18 moves down, as viewed in FIG. 2*a*, to be disengaged from the pawl 17*b*, whereby the unlatched condition cannot be established. This is referred to as a keyless lock system, which eliminates the need for a troublesome operation of the door key cylinder each time the door is to be locked from the outside of the vehicle.

FIG. 2*c* is a horizontal section of the door latch mechanism, with the solid line indicating the primary latch condition and a double dot phantom line indicating a fully latched condition. In the primary latch condition, there is a small clearance between the door DOR1 and the center pillar PLA, but such clearance is substantially eliminated in a fully latched condition. The center pillar PLA is provided with an FR door courtesy switch SWB1 which detects an open or closed condition of the FR door, with a switch knob SWN being mounted on the door DOR1. When the door latch mechanism assumes its fully latched condition, the door DOR1 operates on the switch knob SWN to turn it off. Under other conditions including the primary latch condition, the switch knob SWN is displaced to the right under the resilience of an internally housed spring, thereby turning the switch on.

Since it is contemplated that the arrangement of the invention is mounted on a four door automobile, a similar latch mechanism and lock mechanism is associated with each of a front left-hand (hereafter abbreviated as FL, the same denotation being used as a suffix), a rear right-hand (hereafter abbreviated as RR, the same denotation being also used as a suffix) and a rear left-hand (hereafter abbreviated as RL, the same denotation being also used as a suffix) door. Their specific constructions will not be described, only pointing out the fact that the RR and RL doors are not provided with a door key cylinder.

Figure 3:
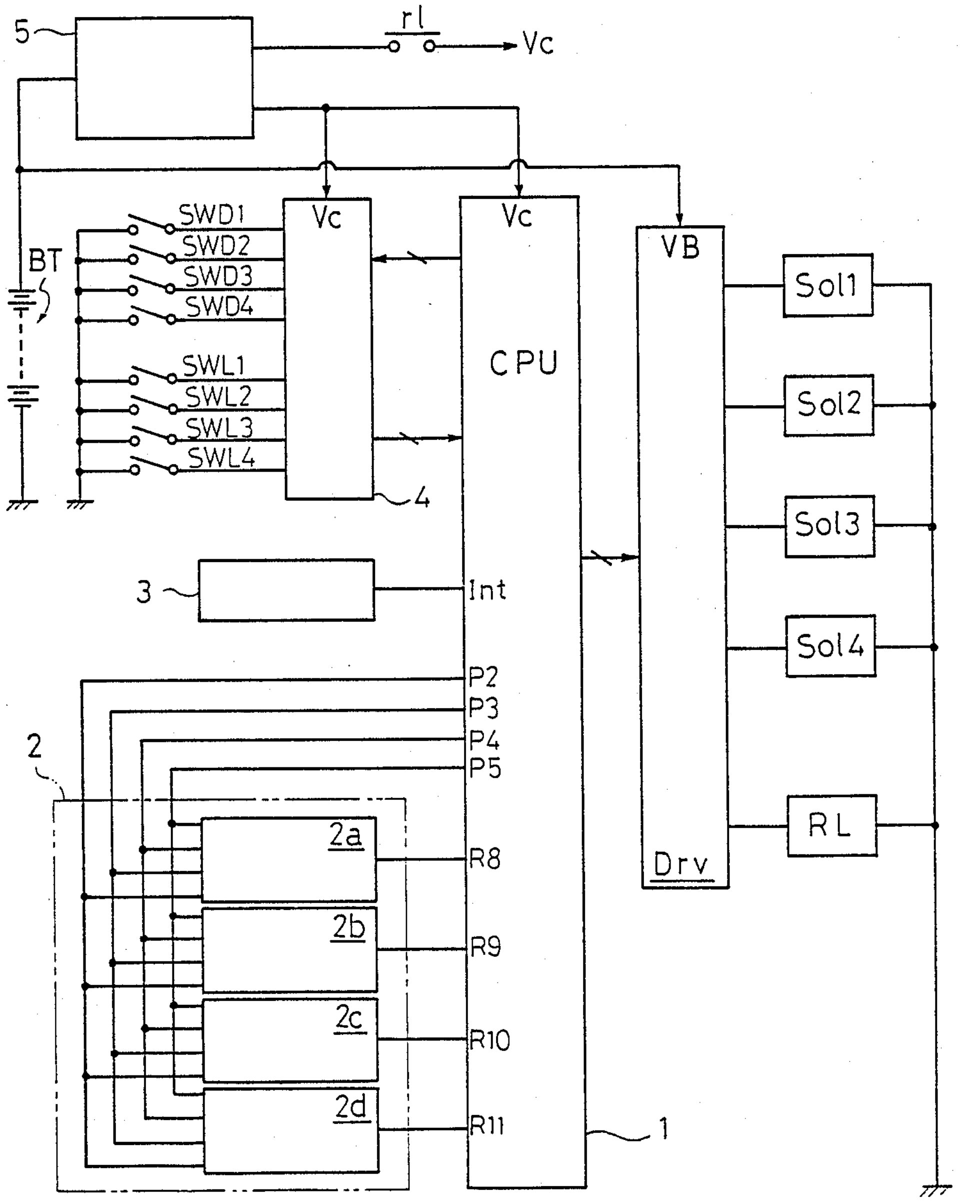
FIG. 3 is a block diagram of a control system which is used with the assembly shown in FIG. 1.

FIG. 3 is a block diagram of a control system which controls the door lock assembly of the invention. The control system essentially comprises a microcomputer (hereafter referred to as CPU) 1, an occupant detector unit 2, 0.1 second timer 3, a switch encoder 4, and a driver Drv. The system is fed from an onboard battery BT. Certain components are supplied with a battery voltage VB and a constant voltage Vc which is derived by a constant voltage unit 5, as required. In particular, the occupant detector unit 2 and the 0.1 second timer 3 is fed with the constant voltage Vc through a relay contact r1. The purpose of the driver Drv is to energize or deenergize selectively the door lock solenoid Sol1 associated with the FR door lock mechanism, a door lock solenoid Sol2 for the FL door lock mechanism, a door lock solenoid Sol3 for the RR door lock mechanism, a door lock solenoid Sol4 for the RL door lock mechanism, and a relay RL in accordance with commands from CPU 1. The relay contact r1 referred to above makes or breaks depending on the energization of the relay RL. Specifically, it makes when the relay is energized, feeding the constant voltage Vc to the occupant detector unit 2 and the 0.1 second timer 3.

The switch encoder 4 is connected with the FR door courtesy switch SWD1 (see FIG. *2c*) which detects the open or closed condition of the FR door DOR1, an FL door courtesy switch SWD2 which detects the open or closed condition of the FL door, an RR door courtesy switch SWD3 which detects the open or closed condition of the RR door, an RL door courtesy switch SWD4 which detects the open or closed condition of the RL door, an FR door lock switch SWL1 (see FIG. *2e*) which detects the locked/unlocked condition of the FR door lock solenoid Sol1, an FL door lock switch SWL2 which detects the locked/unlocked condition of the FL door lock solenoid Sol2, an RR door lock switch SWL3 which detects the locked/unlocked condition of the RR door lock solenoid Sol3, and an RL door lock switch SWL4 which detects the locked/unlocked condition of the RL door lock solenoid Sol4. The switch encoder 4 reads the status of these switches, and feeds corresponding information to CPU 1.

The 0.1 second timer 3 has an output terminal which is connected to an interrupt port Int of CPU 1, thus developing an interrupt request to CPU 1 every 0.1 second. In response to the interrupt request from the timer 3, CPU 1 detects the presence or absence of an occupant on each seat utilizing the occupant detector unit 2 which will be described below.

The occupant detector unit 2 includes four sections *2a*, *2b*, *2c* and *2d*, which operate to detect the presence of an occupant on each of the FR, FL, RR and RL seat, respectively. The section *2a* of the occupant detector unit 2 is illustrated in FIG. 4.

Figure 4:
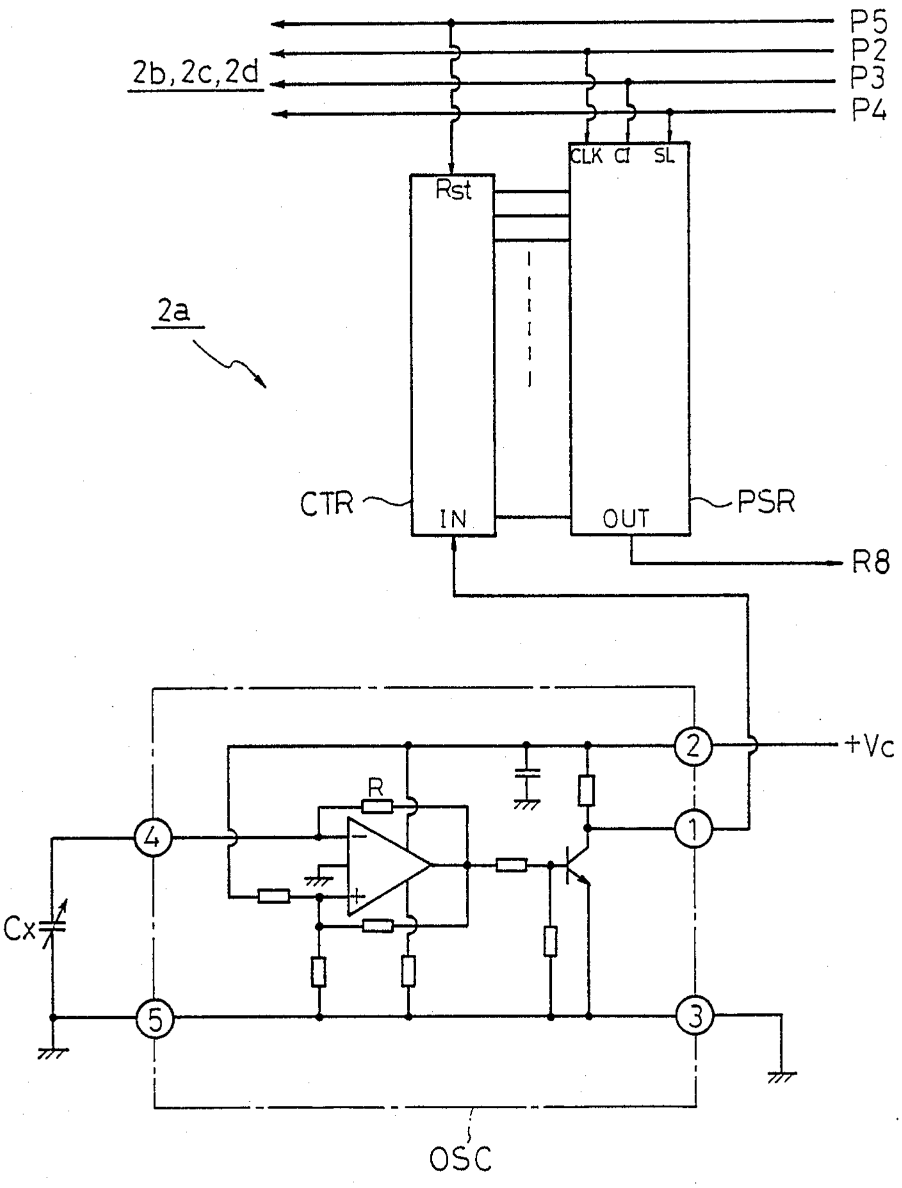
FIG. 4 is a block diagram of driver's seat occupant detector unit 2*a* shown in FIG. 3.

Referring to FIG. 4, the section *2a* comprises an oscillator OSC, a counter CTR, and a parallel-in and serial-out shift register (hereafter abbreviated as PS register) PSR.

The oscillator OSC comprises an astable multivibrator with an external capacitor Cx connected between terminals 4 and 5. In FIG. 4, resistors are indicated by rectangles. By choosing suitable values for the resistors, there can be obtained an output signal of a frequency which is inversely proportional to the product of the capacitance of the external capacitor Cx and the resistance of resistor R, the frequency decreasing for an increased capacitance and increasing for a decreased capacitance of the external capacitor Cx.

The output signal from the terminal 1 of the oscillator OSC is applied to an input terminal IN of the counter CTR, which counts up in response to the leading end of the output signal. The counter CTR have 16 bit parallel output terminals which are connected to 16 bit parallel input terminals of the PS register PSR. The counter CTR has a reset input terminal Rst, which is connected to an output port P5 of CPU 1.

The register PSR has a clock input terminal CLK connected to an output port P2 of CPU 1, a clock inhibit input terminal C1 connected to an output port P3 of CPU 1, and a shift load input terminal SL connected to an output port P4 of CPU 1. The register PSR presets 16 bit data applied to its parallel input terminals into the respective bit positions in response to the leading end of a shift load pulse fed from CPU 1, and serially delivers the preset data from its output terminal OUT to a serial input port R8 of CPU 1 in synchronism with the clock pulse applied to its clock input terminal CLK in response to a change in the clock inhibit signal applied to the clock inhibit input terminal C1 from CPU 1 to its low level (L).

Figure 5:
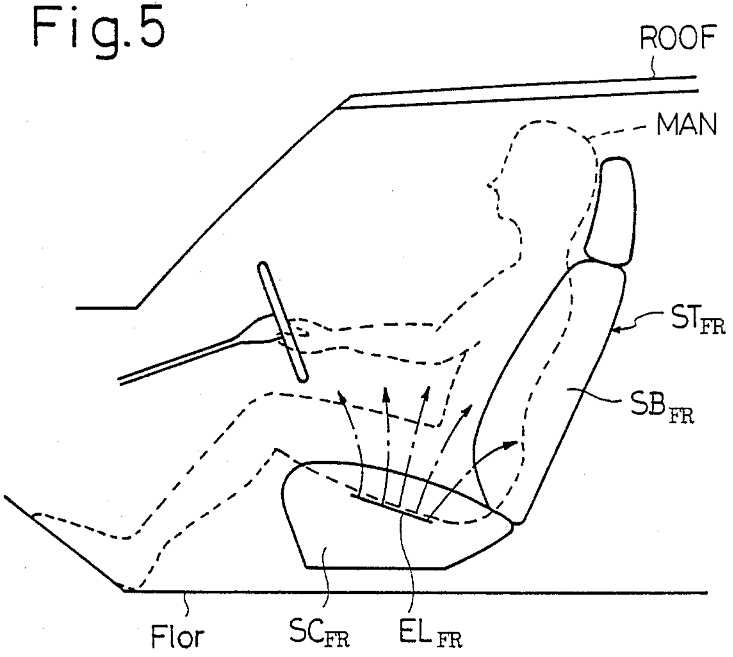
FIG. 5 is a side elevation of a detecting electrode $EL_{FR}$ which is mounted on a driver's seat $ST_{FR}$.

The capacitor Cx shown in FIG. 4 comprises an occupant detecting capacitor defined between a detecting electrode $EL_{RR}$ which is mounted on the seat cushion $SC_{RR}$ of the seat $ST_{RR}$ and the electrical ground defined by the body such as a roof ROOF or a floor Flor, as shown in FIG. 5. Thus, the detecting electrode $EL_{RR}$ is connected to the terminal 4 and the electrical ground is connected to the terminal 5 of the oscillator OSC.

Figure 6A:
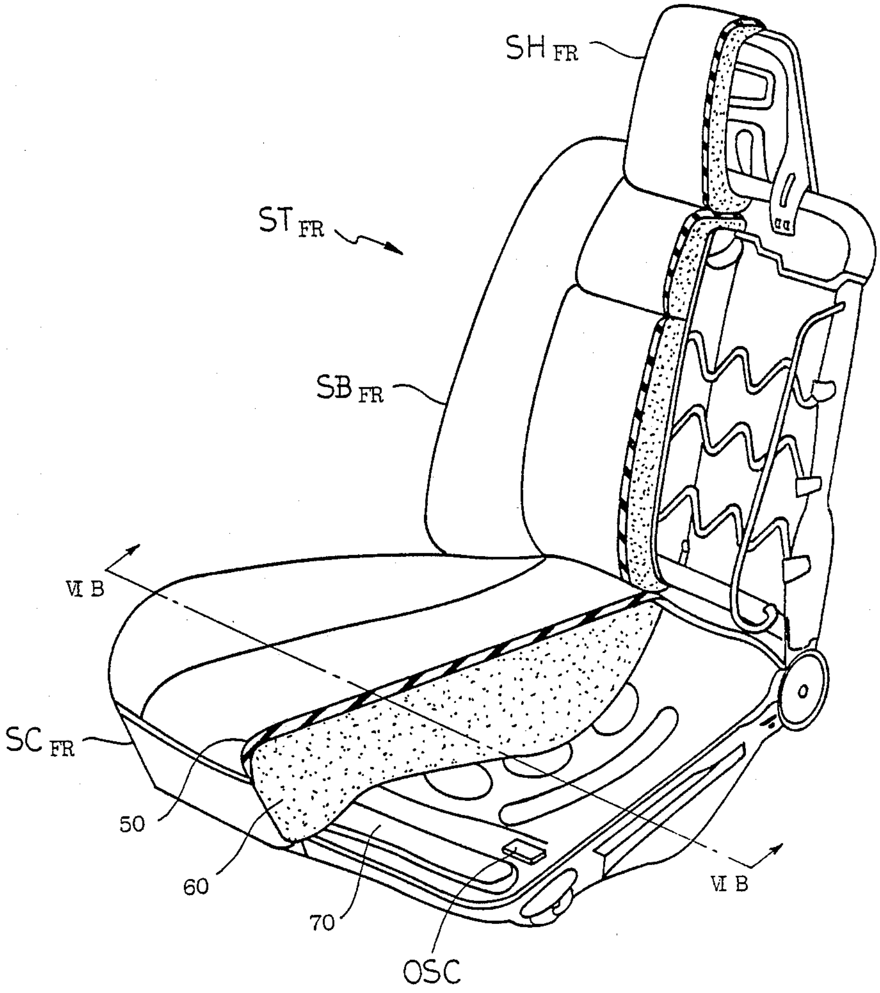
FIG. 6*a* is a perspective view, partly broken away, of the driver's seat $ST_{FR}$.
Figure 6B:
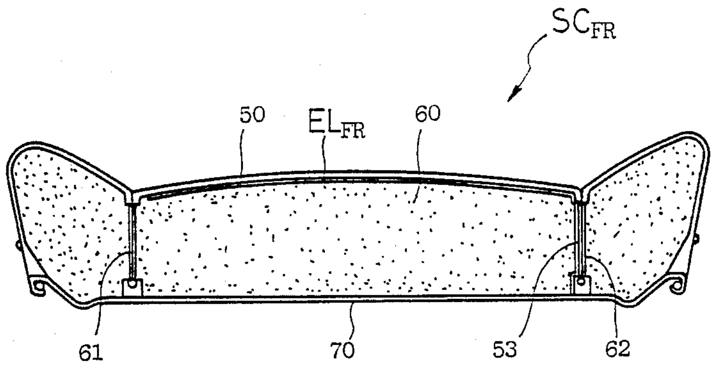
FIG. 6*b* is a cross section of a seat cushion $SC_{FR}$ shown in FIG. 6*a,* taken along a line VIB—VIB.
Figure 6C:
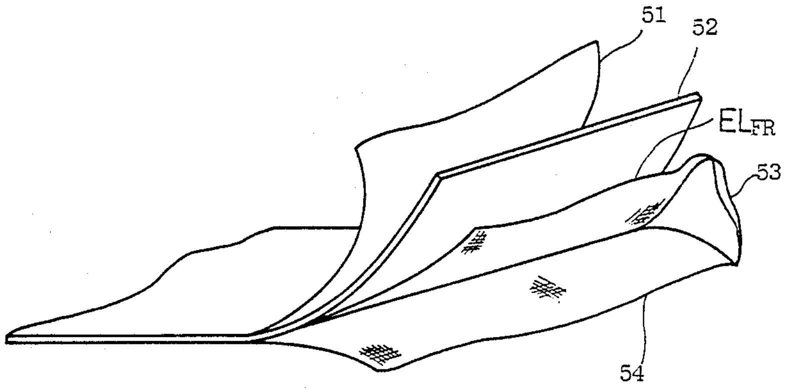
FIG. 6*c* is a perspective view of a trim cover assembly 50 of the seat cushion $SC_{FR}$ shown in FIGS. 6*a* and 6*b;*

The detecting electrode $EL_{FR}$ will be described in detail. FIG. 6 is a cross section, partly broken away, of the FR seat $ST_{FR}$. The seat $ST_{FR}$ comprises a seat cushion $SC_{FR}$, a seat back $SB_{FR}$ and a head rest $SH_{FR}$, each of which comprises a fully foamed sheet employing molded urethane pad, though their support construction is different. FIG. *6b* shows a section of the cushion $SC_{FR}$ taken along the line VIB—VIB in FIG. *6a* or in a plane perpendicular to the direction of vehicle running, in a region where an occupant MAN is seated. The seat cushion $SC_{FR}$ comprises a pad support 70 formed of a resin on which a urethane seat cushion pad 60 covered with a trim cover assembly 50 is disposed. Where necessary, the trim cover assembly 50 is fastened to the underside of the seat cushion pad 60 by tension cords extending through holes 61 and 62 formed so as to extend through the seat cushion pad 60, and its opposite ends are fastened to the pad support 70 for retention. The detecting electrode $EL_{FR}$ is assembled into the trim cover assembly 50 and has a lead wire 53 which is passed through the hole 62 to the underside of the seat cushion pad 60 so as to be connected to the terminal 4 of the oscillator OSC which is mounted on the pad support 70, as shown in FIG. *6a*.

FIG. *6c* shows the detail of the trim cover assembly 50 in a region where the detecting electrode $EL_{FR}$ is assembled. Specifically, it comprises a skin 51, a wadding 52 which serves producing the thickness effect of the trim cover assembly and formed by a sheet of sponge material, and a wadding cover 54. The detecting electrode $EL_{FR}$ is formed by a conductive woven fabric which is subjected to an electroless nickel plating, and is interposed between the wadding 52 and the wadding cover 54 to be stitched as the trim cover assembly 50 is sewn. The electrode has a size which depends on an area, the detection of which is desired, but in the present embodiment, it is sized as about 30 cm square, with its corner formed into a ribbon to define the lead wire 53. Thus it will be seen that the detecting electrode $EL_{FR}$ can be assembled into the trim cover assembly 50 without requiring any additional processing step. Because it conforms to other components of the trim cover assembly, the area of the assembly 50 in which the detecting electrode $EL_{FR}$ is assembled can be treated in the same manner as the remainder. In other words, the detecting electrode $EL_{FR}$ has no adverse influence upon the workability, the appearance or seating reaction.

It will be noted that the skin 51, the wadding 52 and the wadding cover 53 which form the trim cover assembly as well as the seat cushion pad 60 and the pad support 70 are all formed by insulators, and thus the detecting electrode $EL_{FR}$ is insulated from the electrical ground to form an occupant detecting capacitor with the electrical-ground. Arrows shown in phantom lines in FIG. 5 represent electric lines of force which would be produced when a suitable voltage is applied to the occupant detecting capacitor. Since the occupant MAN seated upon the seat $ST_{FR}$ links with these electric lines of force, such occupant may be considered as a high dielectric member interposed between the electrodes of the occupant detecting capacitor. In other words, the occupant detecting capacitor has a capacitance which varies largely between the presence and the absence of the occupant MAN.

Figure 8:
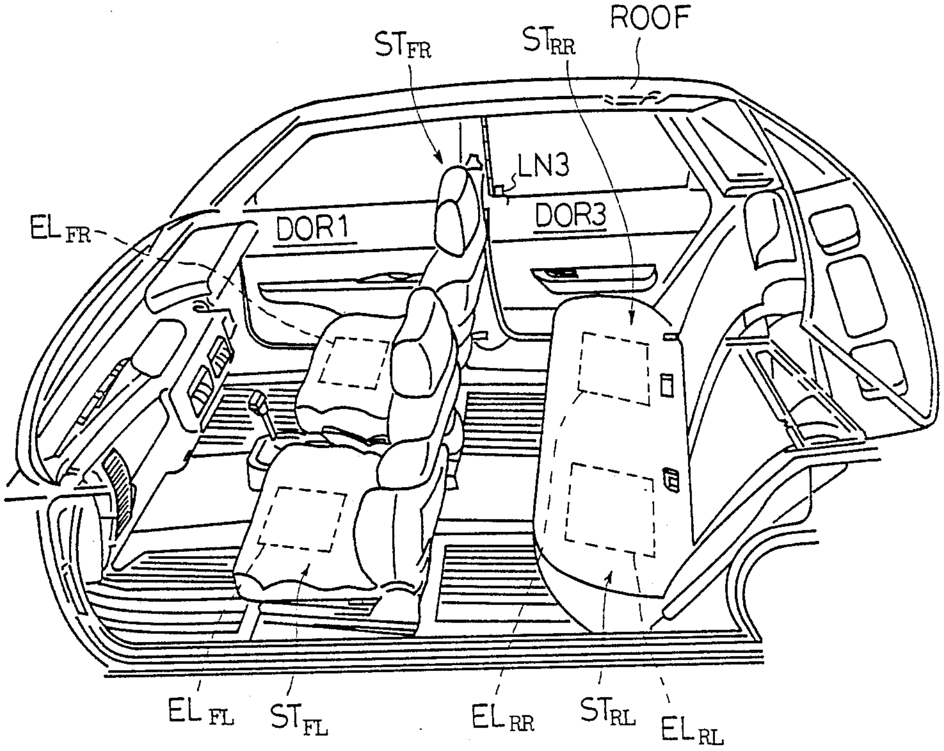
FIG. 8 is a perspective view illustrating the disposition of detecting electrodes $EL_{FR}$, $EL_{FL}$, $EL_{RR}$ and $EL_{RL}$ within the vehicle.

Other sections *2b*, *2c* and *2d* of the occupant detector unit are constructed in an identical manner as the section *2a*. It is to be noted that the oscillator in each unit is connected with the detecting electrodes $EL_{FL}$ assembled into the FL seat $ST_{FL}$, the detecting electrodes $EL_{RR}$ assembled into the RR seat $ST_{RR}$ and the detecting electrodes $EL_{RL}$ assembled into the RL seat $ST_{RL}$. An output terminal of the PS register of each section of the occupant detector unit is connected to a serial input port R9, R10, or R11, respectively, of CPU 1 in the manner illustrated in FIG. 3. The disposition of the seats $ST_{FR}$, $ST_{FL}$, $ST_{RR}$ and $ST_{RL}$ as well as the disposition of the detecting electrodes $EL_{FR}$, $EL_{FL}$, $EL_{RR}$ and $EL_{RL}$ which are assembled therein are illustrated in FIG. 8.

Figure 7:
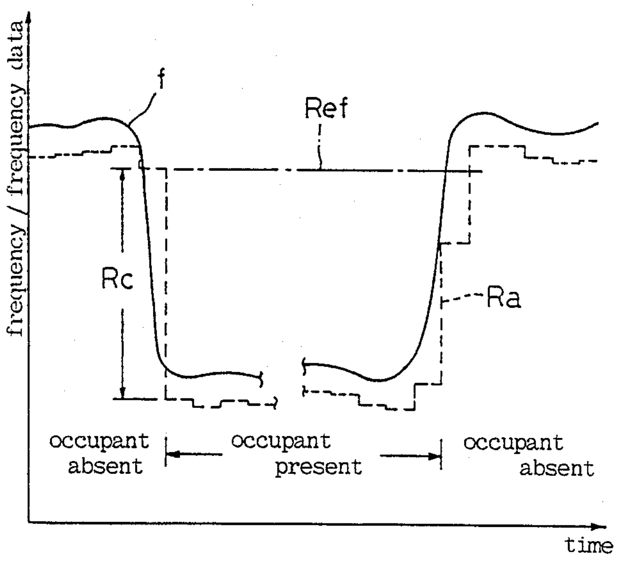
FIG. 7 is a graphical illustration of the principle of detecting the presence of an occupant using a microcomputer 1 shown in FIG. 3.

Referring to FIG. 7, the detection of the presence of an occupant with the apparatus of the embodiment will be described briefly. FIG. 8 graphically shows an example of a change in the oscillation frequency f of the oscillator OSC with time by a solid line curve, frequency data Ra which is sampled by CPU 1 by a broken line curve and reference data Ref established by CPU 1 by a phantom line curve, respectively.

CPU 1 samples the number of pulses which are output from the oscillator during the interrupt period of 0.1 second timer 3 or during a time interval of 0.1 second, and which corresponds to the oscillation frequency f of the oscillator, thereby monitoring a change in the oscillation frequency f. Specifically, frequency data Ra obtained during a current sampling is compared against old frequency data which is obtained during the immediately preceding sampling to derive change data Rc. While the oscillation frequency f of the oscillator OSC is continually changing though slightly, there occurs a rapid reduction in a frequency to cause the change data Rc to exceed a given value when the occupant $MAN_{RR}$ is seated upon the seat $ST_{RR}$. Upon detection of this change, the presence of an occupant is determined, and the frequency data which was obtained before the occurrence of the reduction or obtained during the previous sampling is chosen as a reference data Ref. Subsequently, the frequency data Ra is examined, and the absence of an occupant is determined if it exceeds reference data Ref.

When no occupant is present on any seat and when all the doors are closed, CPU 1 energizes the door lock solenoid of any door lock mechanism which fails to be locked, thus locking all the lock mechanisms.

Figure 9:
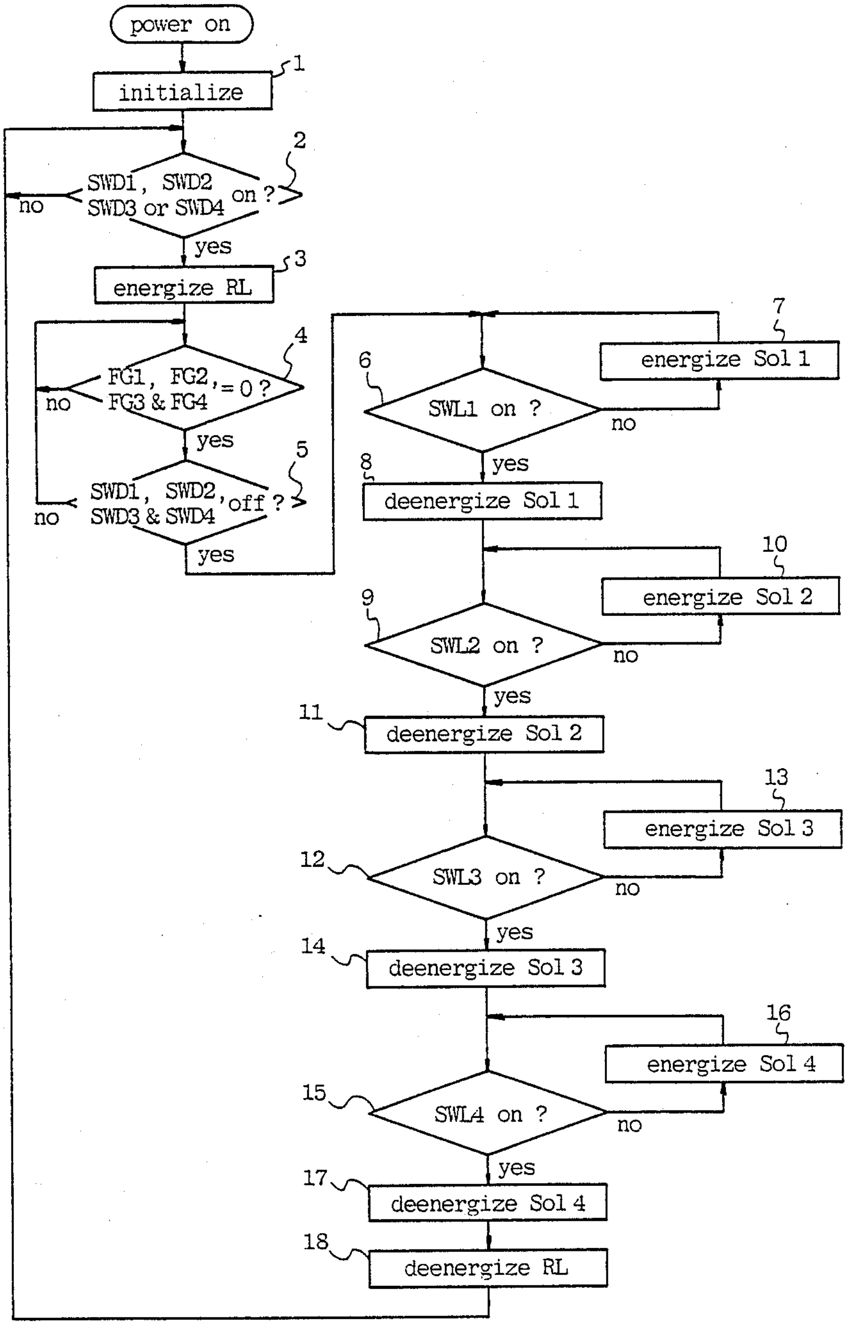
FIGS. 9 and 10 are flowcharts schematically illustrating the operation of the microcomputer 1 shown in FIG. 3.
Figure 10:
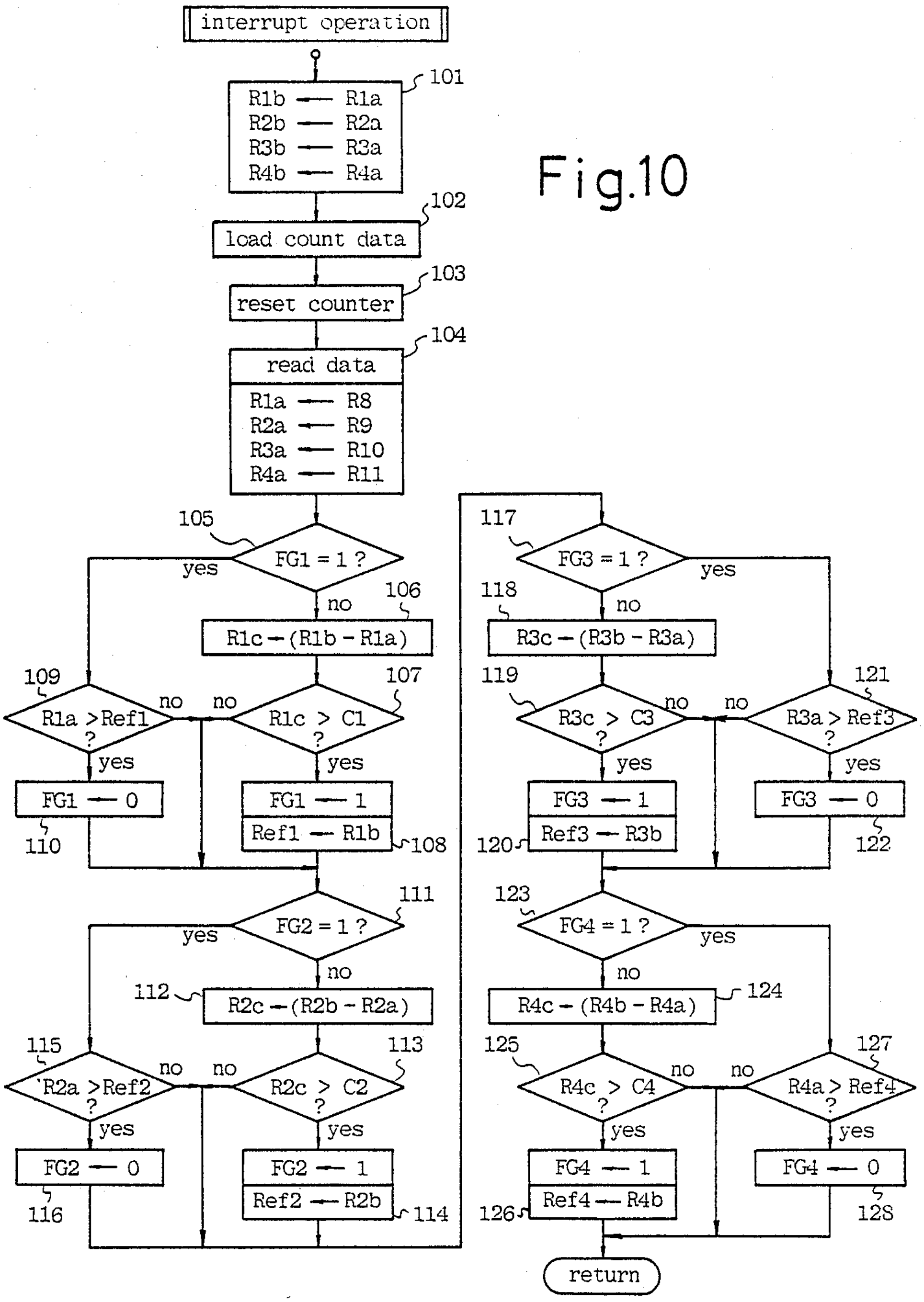

The operation of CPU 1 will be described more specifically with reference to flowcharts shown in FIGS. 9 and 10. When the onboard battery BT is properly connected to feed the various components of the arrangement, CPU 1 initializes by resetting every output port and related components at step 1 (the step number being entered in the flowcharts). Subsequently, it establishes a standby mode at step 2 in which the status of the door courtesy switches SWD1 to SWD4 is monitored. During the standby mode, the relay RL is deenergized while feeding the minimum circuit component, thus preventing an accelerated exhaustion of the onboard battery BT.

When at least one of the doors is opened, CPU 1 delivers a command which causes the relay driver Drv to energize the relay RL and also enables an interrupt operation requested by the timer 3 at step 3. As the relay RL is energized, the occupant detector unit 2 and the timer 3 are fed with the constant voltage Vc. Subsequently, the timer 3 develops an interrupt request every 0.1 second.

In response to the interrupt request from the timer 3, CPU 1 executes an interrupt processing operation in which the presence or absence of an occupant on any of the four seats is detected. Thus, the detection of an occupant is not performed during the standby mode inasmuch as there can be no occupant within the vehicle unless any one of the doors is opened.

The interrupt processing operation will now be described with reference to the flowchart shown in FIG. 10. In the interrupt processing operation, data in a register R1*a* is stored in register R1*b*, data in a register R2*a* is stored in register R2*b*, data in a register R3*a* is stored in register R3*b*, and data in a register R4*a* is stored in register R4*b*, at step 101. As will be apparent from the following description, such data represents the frequency data obtained during the immediately preceding interrupt operation or 0.1 second before. At step 102, a shift load pulse (SL pulse) is delivered to the shift load input terminal of PS register PSR associated with each section of the occupant detector unit, and count data in the counter CTR is preset therein. At step 103, a reset pulse is applied to the reset input terminal Rst of the counter CTR, thereby resetting it. In this manner, the counter CTR counts the number of pulses developed by the oscillator OSC during the interrupt period of the timer 3.

At step 104, the clock inhibit signal which is applied to the clock inhibit input terminal C1 is changed to its low level (L), whereby preset data in the respective register PSR which is serially delivered from its output terminal OUT in synchronism with the clock pulse is read. In this manner, the input to the serial input ports R8, R9, R10 and R11 is read and is stored in the registers R1*a*, R2*a*, R3*a* and R4*a*, respectively, as frequency data.

The subsequent processing comprises an occupant detecting routine for the seat $ST_{FR}$ comprising steps 105 to 110 as well as similar routines for the seats $ST_{FL}$, $ST_{RR}$ and $ST_{RL}$ each comprising steps 111 to 116, steps 117 to 122 and steps 123 to 128. Since each routine is identical, the routine for the seat $ST_{FR}$ will be specifically described.

A flag FG indicates the presence or absence of an occupant on the seat $ST_{FR}$. It is initially assumed that the flag is reset to 0, indicating the absence of an occupant. At step 106, the content of register R1*a* is subtracted from the content of the register R1*b* to provide a change data, which is written into register R1*c*. At step 107, the content of the register R1*c* (change data) is compared against a threshold value Cl which is determined experimentarily. When no occupant is seated upon the seat $ST_{FR}$, the change data will have a small value and does not exceed the threshold Cl. Accordingly, the program directly proceeds to step 111 and subsequent steps. However, when an occupant is seated, there occurs a rapid reduction in the oscillation frequency of the oscillator OSC as mentioned previously, whereby the change data exceeds the threshold Cl. In this instance, the flag FG is set to "1" at step 108, and the content of the register R1*b* or the old frequency data is written into the register Ref1 as reference data at step 109.

When the flag FG is set, the content of the register Ref1 or the reference data is compared against the content of the register R1*a* or fresh frequency data during the subsequent interrupt processing operation. As mentioned, when an occupant is seated upon the seat $ST_{FR}$, any change in the oscillation frequency of the oscillator OSC is small, and hence the fresh frequency data stored in the register R1*a* cannot exceed reference data stored in the register Ref1. However, when the occupant who has been sitting on the seat $ST_{FR}$ gets out of the vehicle, there occurs a rapid increase in the oscillation frequency, whereby the fresh frequency data stored in the register R1*a* exceeds the reference data stored in the register Ref1. At this time, the flag FG is reset to "0" at step 111.

It will be understood that in each of three other occupant detecting routines, flags FG2 to FG4 are set or reset in accordance with the detection or failure of detection of an occupant.

In this manner, during the interrupt processing operation, the presence or absence of an occupant is detected in terms of a change in the capacitance between the detecting electrode $EL_{FR}$ and the electrical ground, thus avoiding the likelihood of an erroneous detection due to the influences of the temperature, humidity or aging effect. It is to be understood that when a baggage or the like is placed upon the seat, a corresponding change in the capacitance differs largely from that which occurs when an occupant is seated, thus avoiding an erroneous detection which might be caused by a conventional seating switch (which is assembled into the seat cushion and is turned on when a weight is applied thereon).

Returning to FIG. 9, flags FG1, FG2, FG3 and FG4 are monitored at step 4, and the door courtesy switches SWD1, SWD2, SWD3 and SWD4 are monitored at step 5. If all of the flags are reset and all the door courtesy switches are off, this means that all the occupants have get off the vehicle and all the doors have been closed. Accordingly, it is expected that occupants are away from the vehicle. The program then proceeds to step 6 and subsequent steps where a door lock routine is executed.

If it is found at step 6 in which the status of the FR door lock switch SWL1 is examined that this switch is off, CPU 1 provides a command at step 7 which causes the driver Drv to energize the FR door lock solenoid Sol1. Subsequently when the switch SWL1 becomes on, CPU 1 provides a command at step 8 which causes the driver Drv to deenergize the solenoid Sol1. In a similar manner, during steps 9 to 11, the FL door lock solenoid Sol2 is energized until the FL door lock switch SWL2 becomes on; during steps 12 to 14, the RR door lock solenoid Sol3 is energized until the RR door lock switch SWL3 becomes on; and during steps 15 to 17, the RL door lock solenoid Sol4 is energized until the RL door lock switch SWL4 becomes on. Thus, in the door lock routine, each door lock switch is sequentially examined, and each time an off condition of the switch is detected, the corresponding door lock solenoid is energized to lock the door lock mechanism.

Upon completion of the door lock routine, CPU 1 provides a command at step 18 which causes the driver Drv to deenergize the relay RL, whereupon the program returns to step 2 to establish the standby mode.

It will be seen that in the present embodiment, the occurrence of overlapping rush currents is prevented by avoiding a simultaneous energization of a plurality of door lock solenoids. As a modification of the described embodiment, the requirement for the absence of an ignition key may be added to the described requirements of no occupant present and all the doors closed in order to initiate the execution of the door lock routine.

From the foregoing, it will be seen that with the lock assembly for an onboard opening cover according to the invention, as soon as an occupant closes the cover for an opening such as a door and leaves the vehicle, drive means is energized to lock it, thus reliably preventing any theft or a tampering with the vehicle after the occupant has left the vehicle.

What is claimed is:

1. A lock assembly for an onboard opening cover which can be opened and closed to cover an opening of a vehicle comprising:

a lock mechanism for blocking an opening operation of the onboard opening cover;

means for detecting an open or closed condition of the onboard cover;

means for detecting the presence or absence of an occupant within the vehicle including:

a detecting electrode which establishes an electric field passing through at least part of an occupant;

means for detecting a capacitance defined by the detecting electrode; and decision means for determining the presence or absence of an occupant based on a change in the capacitance detected; and control means for locking the lock mechanism whenever the absence of an occupant is detected and the closed condition of the onboard opening cover is detected.

2. A lock assembly according to claim 1 in which the onboard opening cover comprises a door of a vehicle and the lock mechanism comprises a door lock mechanism.

3. A lock assembly according to claim 1 in which the control means comprises drive means for locking the door lock mechanism, and means for energizing the drive means whenever the absence of an occupant is detected and the closed condition of the door is detected.

4. A lock assembly according to claim 1 in which the onboard opening cover comprises a plurality of doors of a vehicle, and the lock mechanism comprises a plurality of door lock mechanisms associated with the respective doors.

5. A lock assembly according to claim 4 in which the control means comprises drive means for locking each of the door lock mechanisms, and means for energizing the drive means whenever the absence of an occupant is detected and the closed condition of all the doors is detected.

6. A lock assembly according to claim 4 in which the control means comprises drive means for locking each of the door lock mechanisms, lock detecting means for detecting the locked/unlocked condition of each of the door lock mechanisms, and means for energizing the drive means whenever the absence of an occupant is detected, the closed condition of all the doors is detected and the unlocked condition of the door lock mechanism is detected.

7. A lock assembly according to claim 1 in which the detecting electrode is mounted in at least part of the onboard seat.

8. A lock assembly according to claim 1 in which the decision means determines the presence of an occupant in response to an increase in the capacitance detected and determines the absence of an occupant in response to a reduction in the capacitance detected.

* * * * *